US012753304B2

(12) United States Patent
Chellamuthu et al.

(10) Patent No.: US 12,753,304 B2
(45) Date of Patent: Oct. 6, 2026

(54) TRANSPARENT FLAME RETARDANT DUCTILE COMPOSITIONS AND THIN-WALL ARTICLES THEREOF

(71) Applicant: SHPP Global Technologies B.V., Bergen op Zoom (NL)

(72) Inventors: Manojkumar Chellamuthu, Newburgh, IN (US); Zachary Anderson, Evansville, IN (US); Peter Hendrikus Theodorus Vollenberg, Evansville, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 663 days.

(21) Appl. No.: 18/202,171

(22) Filed: May 25, 2023

(65) Prior Publication Data

US 2023/0383120 A1 Nov. 30, 2023

(30) Foreign Application Priority Data

May 25, 2022 (EP) ..................................... 22175410

(51) Int. Cl.
*C08L 69/00* (2006.01)
*C08K 5/5399* (2006.01)

(52) U.S. Cl.
CPC ............ *C08L 69/00* (2013.01); *C08K 5/5399* (2013.01); *C08L 2205/025* (2013.01); *C08L 2205/035* (2013.01); *C08L 2207/20* (2013.01)

(58) Field of Classification Search
CPC ........................... C08L 69/00; C08L 2205/025
See application file for complete search history.

(56) References Cited

U.S. PATENT DOCUMENTS

| | | | | |
|---|---|---|---|---|
| 892,766 | A | 7/1908 | Shumate | |
| 1,065,500 | A | 6/1913 | Bishop | |
| 6,723,864 | B2 | 4/2004 | Silva et al. | |
| 7,135,538 | B2 | 11/2006 | Glasgow et al. | |
| 7,232,854 | B2 | 6/2007 | Ma et al. | |
| 8,841,367 | B2 | 9/2014 | Zheng et al. | |
| 9,023,922 | B2 * | 5/2015 | Zhao | C08K 5/523 524/138 |
| 9,096,785 | B2 | 8/2015 | Guo et al. | |
| 9,228,067 | B2 * | 1/2016 | Xu | C08L 69/00 |
| 9,458,315 | B2 | 10/2016 | Li et al. | |
| 9,580,595 | B2 | 2/2017 | Morizur et al. | |
| 9,598,578 | B1 | 3/2017 | Groote et al. | |
| 11,193,014 | B2 | 12/2021 | Hein et al. | |
| 2004/0039145 | A1 | 2/2004 | Silva et al. | |
| 2013/0317141 | A1 | 11/2013 | Cheng et al. | |
| 2013/0317146 | A1 * | 11/2013 | Li | C08L 69/005 524/121 |
| 2014/0206800 | A1 | 7/2014 | Wu et al. | |

FOREIGN PATENT DOCUMENTS

| | | | |
|---|---|---|---|
| EP | 2890743 | B1 | 7/2017 |
| EP | 3350263 | A1 | 7/2018 |
| WO | 2013175456 | A1 | 11/2013 |
| WO | 2016151362 | A1 | 9/2016 |
| WO | 2017087362 | A1 | 5/2017 |
| WO | 2019123029 | A1 | 6/2019 |
| WO | 2012198855 | A1 | 10/2021 |
| WO | 2022024073 | A1 | 2/2022 |

OTHER PUBLICATIONS

European Search Report issued by the European Patent Office on Nov. 9, 2022 for European Application No. 22175410.4 filed May 25, 2022, 12 pages.
Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003.

* cited by examiner

*Primary Examiner* — Brieann R Johnston
(74) *Attorney, Agent, or Firm* — CANTOR COLBURN LLP

(57) ABSTRACT

A thermoplastic composition comprising a highly branched polycarbonate comprising 1.5-5.0 mole % branching, wherein the highly branched polycarbonate has a weight average molecular weight of 25,000-45,000 grams per mole; a branched polycarbonate comprising 0.1-1.0 mole % branching, wherein the branched polycarbonate has a weight average molecular weight of 25,000-45,000 grams per mole; a first poly(carbonate siloxane) having 30-70 wt % siloxane, a second poly(carbonate siloxane) having 5-15 wt % siloxane, and wherein the total siloxane content provided to the thermoplastic composition by the first and second poly (carbonate-siloxanes) is less than 4.17 wt %; and wherein the ratio of the siloxane content provided to the thermoplastic composition by the first poly(carbonate siloxane) to the siloxane content provided to the thermoplastic composition by the second poly(carbonate siloxane) is less than 6.7 to 1, a flame retardant comprising a phosphorous-nitrogen bond; optionally, an auxiliary polycarbonate.

16 Claims, No Drawings

TRANSPARENT FLAME RETARDANT DUCTILE COMPOSITIONS AND THIN-WALL ARTICLES THEREOF

CROSS-REFERENCE TO RELATED APPLICATIONS

This application claims priority to European Application No. 22175410.4, filed May 25, 2022, the content of which is incorporated by reference in its entirety.

BACKGROUND

This disclosure relates to thermoplastic compositions, and in particular to transparent, flame retardant, ductile thermoplastic compositions, methods of manufacture, and uses thereof.

Polycarbonates are useful in the manufacture of articles and components for a wide range of applications, from automotive parts to electronic appliances. Because of their broad use, it is desirable to provide polycarbonates that when molded into transparent articles having thin walls are flame retardant.

There accordingly remains a need in the art for thermoplastic compositions that are flame retardant and provide transparency. It would be a further advantage if the compositions were halogen-free.

SUMMARY

The above-described and other deficiencies of the art are met by a thermoplastic composition comprising a highly branched polycarbonate comprising 1.5-5.0 mole % branching, wherein the highly branched polycarbonate has a weight average molecular weight of 25,000-45,000 grams per mole, as determined by gel permeation chromatography, according to polystyrene standards and calculated for polycarbonate; a branched polycarbonate comprising 0.1-1.0 mole % branching, wherein the branched polycarbonate has a weight average molecular weight of 25,000-45,000 grams per mole, as determined by gel permeation chromatography, according to polystyrene standards and calculated for polycarbonate; a first poly(carbonate siloxane) having 30-70 wt % siloxane, a second poly(carbonate siloxane) having 5-15 wt % siloxane, and wherein the total siloxane content provided to the thermoplastic composition by the first and second poly (carbonate-siloxanes) is less than 4.17 wt %; and wherein the ratio of the siloxane content provided to the thermoplastic composition by the first poly(carbonate siloxane) to the siloxane content provided to the thermoplastic composition by the second poly(carbonate siloxane) is less than 6.7 to 1, a flame retardant comprising a phosphorous-nitrogen bond; optionally, an auxiliary polycarbonate.

In another aspect, a method of manufacture comprises combining the above-described components to form a thermoplastic composition.

In yet another aspect, an article comprises the above-described thermoplastic composition.

In still another aspect, a method of manufacture of an article comprises molding, extruding, or shaping the above-described thermoplastic composition into an article.

The above described and other features are exemplified by the following detailed description, examples, and claims.

DETAILED DESCRIPTION

Due to the miniaturization of electronic parts and market trends, there is a need for transparent, flame retardant articles with good processability (i.e., ductility). Branched polycarbonates can be incorporated to impart desirable flame test performance (i.e., V-0 or V-1), but molded articles prepared from branched polycarbonates can be brittle and lack ductility. Poly(carbonate siloxanes) can be added to improve the impact resistance of branched thermoplastic composition s, but it can be challenging to determine the combination of poly(carbonate siloxanes) that improve the ductility of the compositions, without sacrificing transparency. The inventors hereof have discovered that a combination including a first poly(carbonate siloxane) having a siloxane content of 30-70 wt % when used in combination with a second poly(carbonate siloxane) having a siloxane content from 5-15 wt % provide the desired combination of flame test performance and transparency. Advantageously, the first poly(carbonate siloxane) serves as an anti-drip agent, so that the compositions provide the desired flame test performance without adding halogenated anti-drip agents.

Advantageously, the first poly(carbonate siloxane) serves as an anti-drip agent, so that the compositions provide the desired flame test performance in the absence of halogenated anti-drip agents. Due to market trends and governmental regulations, there is increased demand for articles prepared from halogen-free compositions. As used herein, the term "halogen-free" is as defined by IEC 61249-2-21 or UL 746H. According to International Electrochemical Commission, Restriction Use of Halogen (IEC 61249-2-21), a composition should include 900 parts per million (ppm) or less of each of chlorine and bromine and also include 1500 ppm or less of total bromine, chlorine, and fluorine content. According to UL 746H, a composition should include 900 ppm or less of each of chlorine, bromine, and fluorine and 1500 ppm or less of the total chlorine, bromine, and fluorine content. The bromine, chlorine, and fluorine content in ppm may be calculated from the composition or measured by elemental analysis techniques. Conventional flame retardants can include or exclude halogens, but commonly employed anti-drip agents include PTFE-encapsulated styrene-acrylonitrile copolymers (e.g., TSAN) and thus include fluorine. Flame retardants that are not brominated, chlorinated, or fluorinated have been used in conventional thermoplastic compositions, but an anti-drip agent is usually present in combination with the flame retardant, causing the halogen content of the composition to exceed the 1500 ppm total halogen limit per IEC 61249-2-21 and UL 746H. Similarly, when flame retardants that are not brominated or chlorinated, but are fluorinated are used in combination with a fluorinated anti-drip agent, then the halogen content of the composition due to the presence of fluorine exceeds the 1500 ppm total halogen limit per IEC 61249-2-21 or UL 746H. Therefore, it is a particular advantage that the anti-drip agent is non-fluorinated, so that the anti-drip agent does not contribute halogen content to the total halogen content of the compositions.

The thermoplastic compositions includes a highly branched polycarbonate, a flame retardant comprising a phosphorous-nitrogen bond, the above-described combination of poly(carbonate-siloxanes), and optionally, an auxiliary polycarbonate that can include a linear and/or branched polycarbonate different from the highly branched polycarbonate.

"Polycarbonate" as used herein means a polymer having repeating structural carbonate units of formula (1)

(1)

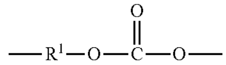

in which at least 60 percent of the total number of $R^1$ groups contain aromatic moieties and the balance thereof are aliphatic, alicyclic, or aromatic. In an aspect, each $R^1$ is a $C_{6-30}$ aromatic group, that is, contains at least one aromatic moiety. $R^1$ can be derived from an aromatic dihydroxy compound of the formula $HO—R^1—OH$, in particular of formula (2)

$$HO\text{-}A^1\text{-}Y^1\text{-}A^2\text{-}OH \quad (2)$$

wherein each of $A^1$ and $A^2$ is a monocyclic divalent aromatic group and $Y^1$ is a single bond or a bridging group having one or more atoms that separate $A^1$ from $A^2$. In an aspect, one atom separates $A^1$ from $A^2$. Preferably, each $R^1$ can be derived from a bisphenol of formula (3)

(3)

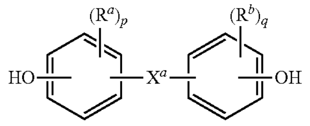

wherein $R^a$ and $R^b$ are each independently a halogen, $C_{1-12}$ alkoxy, or $C_{1-12}$ alkyl, and p and q are each independently integers of 0 to 4. It will be understood that when p or q is less than 4, the valence of each carbon of the ring is filled by hydrogen. Also in formula (3), $X^a$ is a bridging group connecting the two hydroxy-substituted aromatic groups, where the bridging group and the hydroxy substituent of each $C_6$ arylene group are disposed ortho, meta, or para (preferably para) to each other on the $C_6$ arylene group. In an aspect, the bridging group $X^a$ is single bond, —O—, —S—, —S(O)—, $—S(O)_2—$, —C(O)—, or a $C_{1-60}$ organic group. The organic bridging group can be cyclic or acyclic, aromatic or non-aromatic, and can further comprise heteroatoms such as halogens, oxygen, nitrogen, sulfur, silicon, or phosphorous. The $C_{1-60}$ organic group can be disposed such that the $C_6$ arylene groups connected thereto are each connected to a common alkylidene carbon or to different carbons of the $C_{1-60}$ organic bridging group. In an aspect, p and q is each 1, and $R^a$ and R are each a $C_{1-3}$ alkyl group, preferably methyl, disposed meta to the hydroxy group on each arylene group.

In an aspect, $X^a$ is a $C_{3-18}$ cycloalkylidene, a $C_{1-25}$ alkylidene of formula $—C(R^c)(R^d)—$ wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula $—C(=R^e)—$ wherein $R^e$ is a divalent $C_{1-12}$ hydrocarbon group. Groups of these types include methylene, cyclohexylmethylidene, ethylidene, neopentylidene, and isopropylidene, as well as 2-[2.2.1]-bicycloheptylidene, cyclohexylidene, 3,3-dimethyl-5-methylcyclohexylidene, cyclopentylidene, cyclododecylidene, and adamantylidene.

In another aspect, $X^a$ is a $C_{1-8}$ alkylene, a $C_{3-18}$ cycloalkylene, a fused $C_{6-18}$ cycloalkylene, or a group of the formula $-J^1\text{-}G\text{-}J^2\text{-}$ wherein $J^1$ and $J^2$ are the same or different $C_{1-6}$ alkylene and G is a $C_{3-12}$ cycloalkylidene or a $C_{6-16}$ arylene.

For example, $X^a$ can be a substituted $C_{3-18}$ cycloalkylidene of formula (4)

(4)

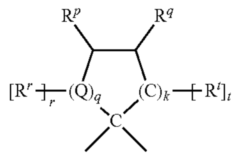

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-12}$ aryl, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and q is 0, the ring as shown in formula (4) contains 4 carbon atoms, when k is 2, the ring as shown in formula (4) contains 5 carbon atoms, and when k is 3, the ring contains 6 carbon atoms. In an aspect, two adjacent groups (e.g., $R^q$ and $R^t$ taken together) form an aromatic group, and in another aspect, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone, or Q can be —N(Z)— wherein Z is phenyl.

Bisphenols wherein $X^a$ is a cycloalkylidene of formula (4) can be used in the manufacture of polycarbonates containing phthalimidine carbonate units of formula (1a)

(1a)

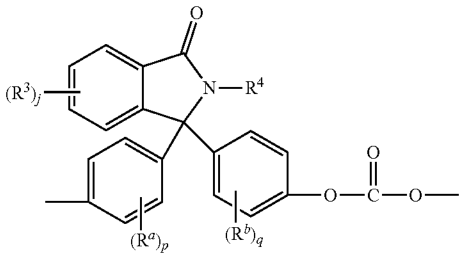

wherein $R^a$, $R^b$, p, and q are as in formula (3), $R^3$ is each independently a $C_{1-6}$ alkyl, j is 0 to 4, and $R_4$ is hydrogen, $C_{1-6}$ alkyl, or a substituted or unsubstituted phenyl, for example a phenyl substituted with up to five $C_{1-6}$ alkyls. For example, the phthalimidine carbonate units are of formula (1b)

(1b)

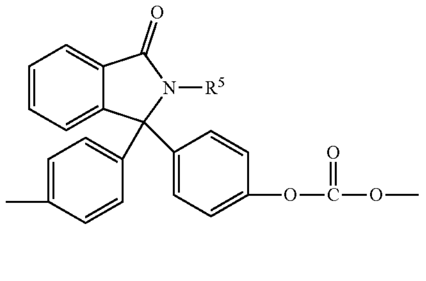

wherein $R^5$ is hydrogen, phenyl optionally substituted with up to five 5 $C_{1-6}$ alkyls, or $C_{1-4}$ alkyl. In an aspect in formula (1b), $R^5$ is hydrogen, methyl, or phenyl, preferably phenyl. Carbonate units (1b) wherein $R^5$ is phenyl can be derived from 2-phenyl-3,3'-bis(4-hydroxy phenyl)phthalimidine (also known as 3,3-bis(4-hydroxyphenyl)-2-phenylisoindolin-1-one, or N-phenyl phenolphthalein bisphenol ("PPPBP")).

Other bisphenol carbonate repeating units of this type are the isatin carbonate units of formula (1c) and (1d)

(1c)

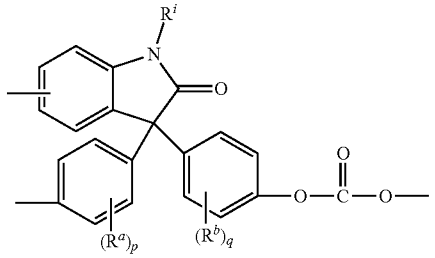

(1d)

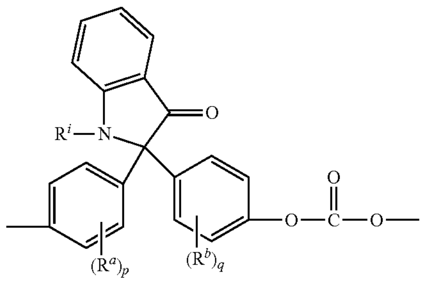

wherein $R^a$ and $R^b$ are each independently a halogen, $C_{1-12}$ alkoxy, or $C_{1-12}$ alkyl, p and q are each independently 0 to 4, and $R^i$ is $C_{1-12}$ alkyl, phenyl optionally substituted with 1 to 5 $C_{1-10}$ alkyl, or benzyl optionally substituted with 1 to 5 $C_{1-10}$ alkyl. In an aspect, $R^a$ and $R^b$ are each methyl, p and q are each independently 0 or 1, and $R^i$ is $C_{1-4}$ alkyl or phenyl.

Other examples of bisphenol carbonate units derived from of bisphenols (3) wherein $X^a$ is a substituted or unsubstituted $C_{3-18}$ cycloalkylidene include the cyclohexylidene-bridged bisphenol of formula (1e)

(1e)

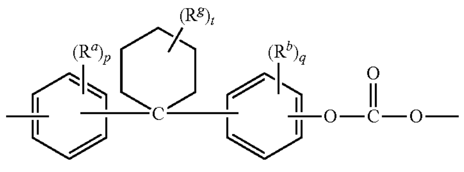

wherein $R^a$ and $R^b$ are each independently $C_{1-12}$ alkyl, $R^g$ is $C_{1-12}$ alkyl, p and q are each independently 0 to 4, and t is 0 to 10. In a specific aspect, at least one of each of $R^a$ and $R^b$ are disposed meta to the cyclohexylidene bridging group. In an aspect, $R^a$ and $R^b$ are each independently $C_{1-4}$ alkyl, $R^g$ is $C_{1-4}$ alkyl, p and q are each 0 or 1, and t is 0 to 5. In another specific aspect, $R^a$, $R^b$, and $R^g$ are each methyl, p and q are each 0 or 1, and t is 0 or 3, preferably 0. In still another aspect, p and q are each 0, each $R^g$ is methyl, and t is 3, such that $X^a$ is 3,3-dimethyl-5-methyl cyclohexylidene.

Examples of other bisphenol carbonate units derived from bisphenol (3) wherein $X^a$ is a substituted or unsubstituted $C_{3-18}$ cycloalkylidene include adamantyl units of formula (If) and fluorenyl units of formula (1g)

(1f)

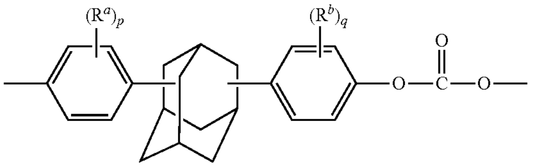

(1g)

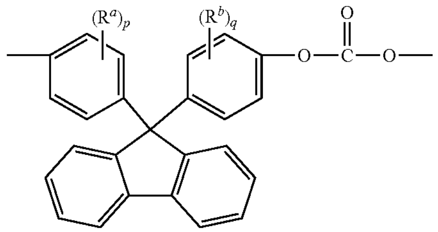

wherein $R^a$ and $R^b$ are each independently $C_{1-12}$ alkyl, and p and q are each independently 1 to 4. In a specific aspect, at least one of each of $R^a$ and $R^b$ are disposed meta to the cycloalkylidene bridging group. In an aspect, $R^a$ and $R^b$ are each independently $C_{1-3}$ alkyl, and p and q are each 0 or 1; preferably, $R^a$, $R^b$ are each methyl, p and q are each 0 or 1, and when p and q are 1, the methyl group is disposed meta to the cycloalkylidene bridging group. Carbonates containing units (1a) to (1g) are useful for making polycarbonates with high glass transition temperatures (Tg) and high heat distortion temperatures.

Other useful dihydroxy compounds of the formula $HO—R^1—OH$ include aromatic dihydroxy compounds of formula (6)

(6)

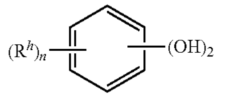

wherein each $R^h$ is independently a halogen atom, $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4. The halogen is usually bromine.

Some illustrative examples of specific dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or a combination thereof.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis (4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). A combination can also be used. In a specific aspect, the polycarbonate is a linear homopolymer derived from bisphenol A, in which each of $A^1$ and $A^2$ is p-phenylene and $Y^1$ is isopropylidene in formula (3).

The thermoplastic composition can include a bisphenol A polycarbonate homopolymer, also referred to as a bisphenol A homopolycarbonate. The bisphenol A polycarbonate homopolymer has repeating structural carbonate units of the formula (1).

(1)

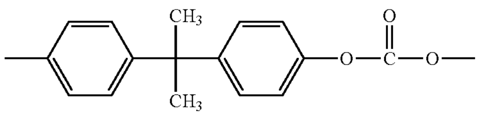

Polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_{1-22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryloyl chloride, and mono-chloroformates such as phenyl chloroformate, alkyl-substituted phenyl chloroformates, p-cumyl phenyl chloroformate, and toluene chloroformate. Combinations of different end groups can be used.

The thermoplastic compositions include a highly branched polycarbonate comprising 1.5-5.0 mole % branching and optionally, an auxiliary branched polycarbonate comprising 0.2-1.0 mole % branching. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. Combinations comprising linear polycarbonates and branched polycarbonates can be used.

In some aspects, a particular type of branching agent is used to create branched polycarbonate materials. These branched polycarbonate materials have statistically more than two end groups. The branching agent is added in an amount (relative to the bisphenol monomer) that is sufficient to achieve the desired branching content, that is, more than two end groups. The molecular weight of the polymer can become very high upon addition of the branching agent, and to avoid excess viscosity during polymerization, an increased amount of a chain stopper agent can be used, relative to the amount used when the particular branching agent is not present. The amount of chain stopper used is generally above 5 mole % and less than 20 mole % compared to the bisphenol monomer.

Such branching agents include aromatic triacyl halides, for example triacyl chlorides of formula (20)

(20)

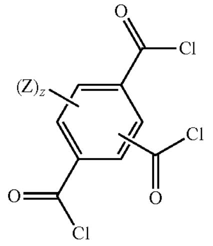

wherein Z is a halogen, $C_{1-3}$ alkyl, $C_{1-3}$ alkoxy, $C_{7-12}$ arylalkylene, $C_{7-12}$ alkylarylene, or nitro, and z is 0 to 3; a tri-substituted phenol of formula (21)

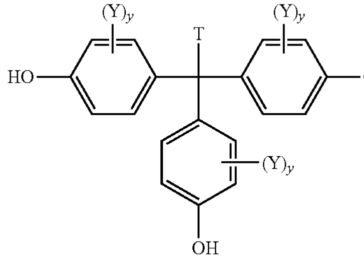

(21)

wherein T is a $C_{1-20}$ alkyl, $C_{1-20}$ alkoxy, $C_{7-12}$ arylalkyl, or $C_{7-12}$ alkylaryl, Y is a halogen, $C_{1-3}$ alkyl, $C_{1-3}$ alkoxy, $C_{7-12}$ arylalkyl, $C_{7-12}$ alkylaryl, or nitro, s is 0 to 4; or a compound of formula (22) (isatin-bis-phenol).

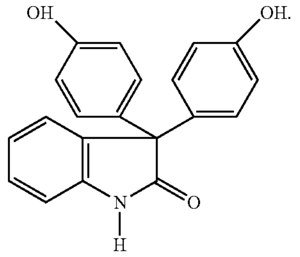

(22)

Examples of specific branching agents that are particularly effective in the compositions include trimellitic trichloride (TMTC), tris-p-hydroxyphenylethane (THPE), and isatin-bis-phenol.

The amount of the branching agents used in the manufacture of the polymer will depend on a number of considerations, for example the type of $R^1$ groups, the amount of chain stopper, e.g., cyanophenol, and the desired molecular weight of the polycarbonate. In general, the amount of branching agent is effective to provide 0.1 to 10 branching units per 100 $R^1$ units, preferably 0.5 to 8 branching units per 100 $R^1$ units, and more preferably 0.75 to 5 branching units per 100 $R^1$ units. For branching agents having formula (20), the branching agent is present in an amount to provide 0.1 to 10 triester branching units per 100 $R^1$ units, preferably 0.5 to 8, and more preferably 0.75 to 5 triester branching units per 100 $R^1$ units. For branching agents having formula (21), the branching agent is present in an amount effective to provide 0.1 to 10 triphenyl carbonate branching units per 100 $R^1$ units, preferably 0.5 to 8, and more preferably 2.5 to 3.5 triphenylcarbonate units per 100 $R^1$ units.

In an aspect, the highly branched polycarbonate comprising units as described above and comprising 1.5-5 mole % branching, comprises greater than or equal to 3 mole %, based on the total moles of the polycarbonate, of moieties derived from a branching agent; and functional groups derived from an end-capping agent having a pKa between 8.3 and 11. The branching agent can comprise trimellitic trichloride, 1,1,1-tris(4-hydroxyphenyl)ethane or a combination of trimellitic trichloride and 1,1,1-tris(4-hydroxyphenyl)ethane, and the end-capping agent is phenol or a phenol containing a substituent of cyano group, aliphatic groups, olefinic groups, aromatic groups, halogens, ester groups, ether groups, or a combination thereof. In a specific aspect, the end-capping agent is phenol, p-t-butylphenol, p-methoxyphenol, p-cyanophenol, p-cumylphenol, or a combination thereof.

The polycarbonates can have an intrinsic viscosity, as determined in chloroform at 25° C., of 0.3 to 1.5 deciliters per gram (dl/gm), preferably 0.45 to 1.0 dl/gm. The polycarbonates can have a weight average molecular weight (Mw) of 10,000 to 200,000 grams per mole (g/mole), preferably 20,000 to 100,000 g/mole, as measured by gel permeation chromatography (GPC), using a crosslinked styrene-divinylbenzene column according to polystyrene standards and calculated for polycarbonate. GPC samples are prepared at a concentration of 1 mg per ml, and are eluted at a flow rate of 1.5 ml per minute.

When an auxiliary polycarbonate is present and includes a linear homopolycarbonate, more than one linear homopolycarbonate can be present. For example, the linear homopolycarbonate can comprise a bisphenol A homo polycarbonate having a weight average molecular weight of 15,000 to 25,000 g/mole or 17,000 to 23,000 g/mole or 18,000 to 22,000 g/mole, and a bisphenol A homopolycarbonate having a weight average molecular weight of 26,000 to 40,000 g/mole or 26,000 to 35,000 g/mole, each measured by GPC according to polystyrene standards and calculated for polycarbonate. The weight ratio of the linear homopolycarbonates relative to one another is 10:1 to 1:10, preferably 5:1 to 1:5, more preferably 3:1 to 1:3, or 2:1 to 1:2. The linear homopolycarbonate can be present in an amount of 10 to 99 wt %, or 30-60 wt %, based on the total weight of the thermoplastic composition.

The highly branched polycarbonate comprising 1.5-5.0 mole % branching and the auxiliary polycarbonate can be derived from post-consumer recycled or post-industrial recycled materials or can be produced from at least one monomer derived from bio-based or plastic waste feedstock.

In addition to linear homopolycarbonates, a combination of poly(carbonate-siloxane)s is present in the thermoplastic compositions. The polysiloxane blocks of the poly(carbonate-siloxane)s comprise repeating diorganosiloxane units as in formula (10)

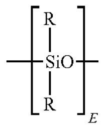

(10)

wherein each R is independently a $C_{1-13}$ monovalent organic group. For example, R can be a $C_{1-13}$ alkyl, $C_{1-13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylaryleneoxy. The foregoing groups can be fully or partially halogenated with fluorine, chlorine, bromine, or iodine, or a combination thereof. In an aspect, where a transparent poly(carbonate-siloxane) is desired, R is unsubstituted by halogen. Combinations of the foregoing R groups can be used in the same copolymer.

The value of E in formula (10) can vary widely depending on the type and relative amount of each component in the thermoplastic composition, the desired properties of the composition, and like considerations. Generally, E has an average value of 2 to 1,000, preferably 2 to 500, 2 to 200, or 2 to 125, 5 to 80, or 10 to 70. In an aspect, E has an average value of 10 to 80 or 10 to 40, and in still another aspect, E has an average value of 40 to 80, or 40 to 70. Where E is of a lower value, e.g., less than 40, it can be desirable to use a relatively larger amount of the poly(carbonate-siloxane) copolymer. Conversely, where E is of a higher value, e.g., greater than 40, a relatively lower amount of the poly(carbonate-siloxane) copolymer can be used. A combination of a first and a second (or more) poly(carbonate-siloxane) copolymers can be used, wherein the average value of E of the first copolymer is less than the average value of E of the second copolymer.

In an aspect, the polysiloxane blocks are of formula (11)

(11)

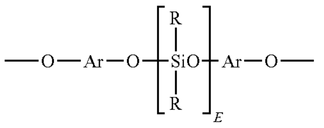

wherein E and R are as defined if formula (10); each R can be the same or different, and is as defined above; and Ar can be the same or different, and is a substituted or unsubstituted $C_{6-30}$ arylene, wherein the bonds are directly connected to an aromatic moiety. Ar groups in formula (11) can be derived from a $C_{6-30}$ dihydroxyarylene compound, for example a dihydroxyarylene compound of formula (3) or (6). Dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane.

In another aspect, polysiloxane blocks are of formula (13)

(13)

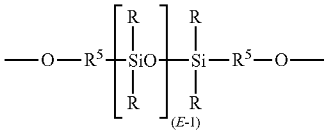

wherein R and E are as described above, and each $R^5$ is independently a divalent $C_{1-30}$ organic group, and wherein the polymerized polysiloxane unit is the reaction residue of its corresponding dihydroxy compound. In a specific aspect, the polysiloxane blocks are of formula (14):

(14)

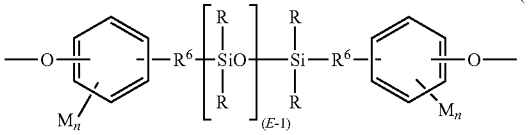

wherein R and E are as defined above. $R^6$ in formula (14) is a divalent $C_{2-8}$ aliphatic group. Each M in formula (14) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, wherein each n is independently 0, 1, 2, 3, or 4.

In an aspect, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another aspect, R is methyl, or a combination of methyl and trifluoropropyl, or a combination of methyl and phenyl. In still another aspect, R is methyl, M is methoxy, n is one, and $R^6$ is a divalent $C_{1-3}$ aliphatic group. Specific polysiloxane blocks are of the formula (14a)

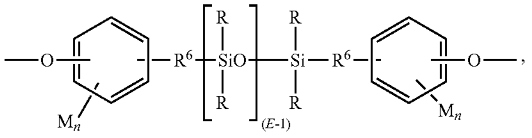

(14b)

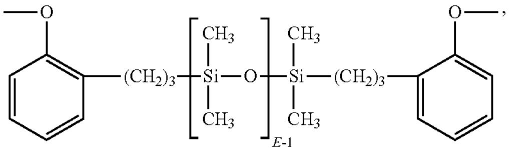

(14c)

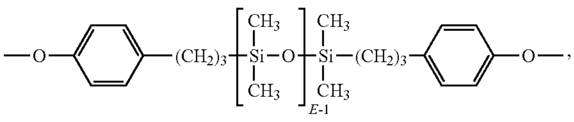

or a combination thereof, wherein E has an average value of 2 to 200, 2 to 125, 5 to 125, 5 to 100, 5 to 50, 20 to 80, or 5 to 20.

Blocks of formula (14) can be derived from the corresponding dihydroxy polysiloxane, which in turn can be prepared effecting a platinum-catalyzed addition between the siloxane hydride and an aliphatically unsaturated monohydric phenol such as eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. The poly(carbonate-siloxane) copolymers can then be manufactured, for example, by the synthetic procedure of European Patent Application Publication No. 0 524 731 A1 of Hoover, page 5, Preparation 2.

Transparent poly(carbonate-siloxane) copolymers comprise carbonate units (1) derived from bisphenol A, and repeating siloxane units (14a), (14b), (14c), or a combination thereof (preferably of formula 14a), wherein E has an average value of 4 to 50, 4 to 15, preferably 5 to 15, more preferably 6 to 15, and still more preferably 7 to 10. The transparent copolymers can be manufactured using one or both of the tube reactor processes described in U.S. Patent Application No. 2004/0039145A1 or the process described in U.S. Pat. No. 6,723,864 can be used to synthesize the poly(carbonate-siloxane) copolymers.

A combination of a first and a second poly(carbonate-siloxane) copolymer are included in the thermoplastic compositions. The first poly(carbonate-siloxane) has a siloxane content of 30 to 70 wt %, based on the total weight of the first poly(carbonate-siloxane). Within this range, the poly (carbonate-siloxane) can have a siloxane content of 35 to 70 wt %, or 35 to 65 wt %, or 35-55 wt %, or 35-45 wt %. As used herein, "siloxane content" of a poly(carbonate-siloxane) refers to the content of siloxane units based on the total weight of the poly(carbonate-siloxane). In some aspects, the first poly(carbonate-siloxane) is comprises up to 10 wt %, for example, 0.1-10 wt %, 0.5-10 wt %, 0.5-7 wt %, or 0.5-5 wt % siloxane, based on the total weight of the composition. The second poly(carbonate-siloxane) has a siloxane content of 5 to 15 wt %, based on the total weight of the poly(carbonate-siloxane). Within this range, the poly (carbonate-siloxane) copolymer can have a siloxane content of 5 to 10 wt %. The second poly(carbonate-siloxane) is comprises 4-15 wt %, for example, 7-15 wt % siloxane, based on the total weight of the composition.

In an aspect, a blend is used, in particular a blend of a bisphenol A homopolycarbonate and a poly(carbonate-siloxane) block copolymer of bisphenol A blocks and eugenol capped polydimethylsiloxane blocks, of the formula siloxane content of less than 4.17 wt %; based on the total weight of the thermoplastic composition.

In some aspects, the siloxane content provided to the thermoplastic compositions by the first poly(carbonate-siloxane) having a siloxane content of 30-70 wt % is greater than the siloxane content provided to the thermoplastic compositions by the second poly(carbonate-siloxane) having a siloxane content of 5-15 wt %. In some aspects, the siloxane content provided to the thermoplastic compositions by the second poly(carbonate-siloxane) having a siloxane content of 5-15 wt % is greater than the siloxane content provided to the thermoplastic compositions by the second poly(carbonate-siloxane) having a siloxane content of 30-70 wt %. The weight ratio of the siloxane content provided to the thermoplastic compositions by the first poly(carbonate-siloxane) to the siloxane content provided to the thermoplastic compositions by the second poly(carbonate-siloxane) is less than about 6.7:1.

The poly(carbonate-siloxane)s can have a melt volume flow rate, measured at 300° C./1.2 kg, of 1 to 50 cubic

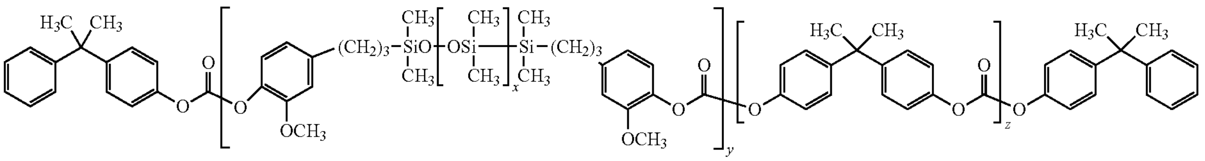

wherein x is 1 to 200, preferably 5 to 85, preferably 10 to 70, preferably 15 to 65, and more preferably 40 to 60; x is 1 to 500, or 10 to 200, and z is 1 to 1000, or 10 to 800. In an aspect, x is 1 to 200, y is 1 to 90 and z is 1 to 600, and in another aspect, x is 30 to 50, y is 10 to 30 and z is 45 to 600. The polysiloxane blocks can be randomly distributed or controlled distributed among the polycarbonate blocks.

The poly(carbonate-siloxanes) can be derived from post-consumer recycled or post-industrial recycled materials or can be produced from at least one monomer derived from bio-based or plastic waste feedstock.

The first poly(carbonate-siloxane)s can have a weight average molecular weight of 2,000 to 100,000 grams per mole (g/mole), preferably 5,000 to 50,000 g/mole as measured by GPC using a crosslinked styrene-divinyl benzene column, at a sample concentration of 1 milligram per milliliter, measured according to polystyrene standards and calculated for polycarbonate. In some aspects, the poly (carbonate-siloxane) having a siloxane content of 30 to 70 wt % and the poly(carbonate-siloxane) having a siloxane content of greater than 10 to 30 wt % can each have a weight average molecular weight of at least 25,000 g/mole, preferably 27,000 g/mole. Within this range, the poly(carbonate-siloxane)s can have a weight average molecular weight of 25,000 to 100,000 g/mole, or 25,000 to 50,000 g/mole.

The second poly(carbonate-siloxane) having a siloxane content of 5 to 15 wt % can have a weight average molecular weight of 17,000 to 25,000 g/mole, preferably 19,000 to 25,000 g/mole as measured by GPC using a crosslinked styrene-divinyl benzene column, at a sample concentration of 1 milligram per milliliter, according to polystyrene standards and calculated for polycarbonate.

The combination of poly(carbonate-siloxane)s can be present in the composition in an amount to provide a total centimeters per 10 minutes (cc/10 min), preferably 2 to 30 cc/10 min. Combinations of the poly(carbonate-siloxane)s of different flow properties can be used to achieve the overall desired flow property.

The thermoplastic compositions include a flame retardant comprising a phosphorous-nitrogen bond. Flame retardant compounds containing phosphorous-nitrogen bonds include phosphazenes, phosphonitrilic chloride, phosphorous ester amides, phosphoric acid amides, phosphonic acid amides, phosphinic acid amides, and tris(aziridinyl) phosphine oxide. Specific examples include phosphoramides of the formula

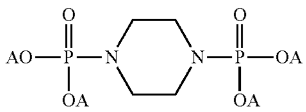

wherein each A moiety is a 2,6-dimethylphenyl moiety or a 2,4,6-trimethylphenyl moiety. These phosphoramides are piperazine-type phosphoramides.

Phosphazenes (18) and cyclic phosphazenes (19)

(18)

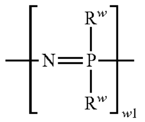

-continued

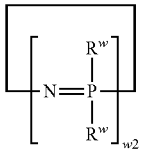

(19)

in particular can be used, wherein w1 is 3 to 10,000 and w2 is 3 to 25, preferably 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorous-Nitrogen Compounds" Academic Press (1972), In the aromatic organophosphorous compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more nonaromatic moieties, for example alkyl, alkenyl, alkynyl, or cycloalkyl. The aromatic moiety of the aromatic group can be directly bonded to the phosphorous-containing group, or bonded via another moiety, for example an alkylene group. The aromatic moiety of the aromatic group can be directly bonded to the phosphorous-containing group, or bonded via another moiety, for example an alkylene group. In an aspect the aromatic group is the same as an aromatic group of the polycarbonate backbone, such as a bisphenol group (e.g., bisphenol A), a monoarylene group (e.g., a 1,3-phenylene or a 1,4-phenylene), or a combination comprising at least one of the foregoing. In an aspect, the phosphazene has a structure represented by the formula

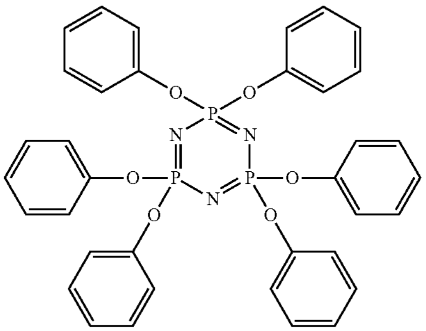 [SMILES: c1ccc(OP2(Oc3ccccc3)=NP(Oc3ccccc3)(Oc3ccccc3)=NP(Oc3ccccc3)(Oc3ccccc3)=N2)cc1]

Commercially available phenoxyphosphazenes having the aforementioned structures are LY202 manufactured and distributed by Lanyin Chemical Co., Ltd, FP-110 manufactured and distributed by Fushimi Pharmaceutical Co., Ltd, and SPB-100 manufactured and distributed by Otsuka Chemical Co., Ltd.

The flame retardant comprising a phosphorous-nitrogen bond is present in an amount effective to provide up to 0.6 wt % phosphorous, based on the total weight if the composition. In addition, if halogenated, the phosphorous-containing flame retardants can be present in an amount effective to provide 900 parts per million (ppm) or less of each of chlorine and bromine and also include 1500 ppm or less of total bromine, chlorine, and fluorine content. In some aspects, the halogenated phosphorous-containing flame retardants can be present in an amount effective to provide 900 ppm or less of each of chlorine, bromine, and fluorine and 1500 ppm or less of the total chlorine, bromine, and fluorine content. These values can be calculated or determined by elemental analysis techniques.

The thermoplastic compositions can include branched polycarbonates present in an amount effective to provide a calculated total branching content of 0.4-1.4 mole % and the flame retardant is present in an amount effective to provide 0.2-0.6 wt % phosphorous, each based on the total composition.

An additive composition can be used, comprising one or more additives selected to achieve a desired property, with the proviso that the additive(s) are also selected so as to not significantly adversely affect the flame retardance, transparency, and anti-drip properties of the thermoplastic composition. The additive composition or individual additives can be mixed at a suitable time during the mixing of the components for forming the composition. The additive can be soluble or non-soluble in polycarbonate. The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, or a combination thereof. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 wt %, or 0.01 to 5 wt %, each based on the total weight of the polymer in the composition.

The thermoplastic composition can include 20-80 wt % of highly branched polycarbonate comprising 1.5-5.0 mole % preferably 2.0-4.0 mole % branching, wherein the highly branched polycarbonate has a weight average molecular weight of 25,000-45,000 grams per mole, as determined by GPC, according to polystyrene standards and calculated for polycarbonate; up to 10 wt % of a first poly(carbonate siloxane) having 30-70 wt % preferably 45-55 wt % siloxane, 4-15 wt % of a second poly(carbonate siloxane) having 5 to 15 wt %, preferably 5-10 wt % siloxane, and a phosphazene flame retardant present in an amount effective to provide up to 0.6 wt % phosphorous; optionally, up to 70 wt % of an auxiliary polycarbonate comprising 5-15 wt % of a branched homopolycarbonate comprising 0.3-1.0 mole %, preferably 0.3-0.5 mole % of a branching agent; up to 70 wt % of a polycarbonate derived from post-consumer recycled or post-industrial recycled material, up to 70 wt % of a polycarbonate different from the branched homopolycarbonate comprising 0.3-1.0 mole % branching agent and the polycarbonate derived from post-consumer recycled or post-industrial recycled material, or a combination thereof.

The thermoplastic compositions can be manufactured by various methods. For example, the powdered polycarbonates, flame retardant, or other optional components are first blended, optionally with fillers in a HENSCHEL-Mixer high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat or downstream through a sidestuffer. Additives can also be compounded into a masterbatch with a desired polymeric polymer and fed into the extruder. The extruder is generally operated at a temperature higher than that necessary to cause the composition to flow. The extrudate is immediately quenched in a water bath and pelletized. The pellets so prepared can be one-fourth inch long or less as desired. Such pellets can be used for subsequent molding, shaping, or forming.

Flammability tests were performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified as HB, V-0, UL-94 V-1, V-2, VA and/or VB.

Shaped, formed, or molded articles comprising the thermoplastic compositions are also provided. The thermoplastic compositions can be molded into useful shaped articles by a variety of methods, such as injection molding, extrusion, rotational molding, blow molding and thermoforming. Some example of articles include computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. In some aspects, the thermoplastic compositions can be used in articles such as mobile phones, tablets, industrial housings, electric circuit protection, personal safety helmets, electric vehicle supply equipment (EVSE) housings and connectors. In some aspects, the thermoplastic compositions can be used in applications such as industrial, building, and construction, automotive exteriors and interiors, electrical and electronics, sport/leisure, personal accessory, mass transportation, healthcare and consumer. It is also suitable for defense, outdoor lawn and landscape, water management, fossils, electrical devices & displays, specialty vehicles, surgical, ophthalmics, rail, home decoration, home appliances, electrical components and infrastructure, personal recreation, healthcare, patient testing, automotive under the hood, commercial appliance, industrial material handling and aerospace, and the like.

The thermoplastic compositions are further illustrated by the following non-limiting examples.

EXAMPLES

The following components are used in the examples. Unless specifically indicated otherwise, the amount of each component is in wt %, based on the total weight of the composition.

The materials shown in Table 1 were used.

TABLE 1

| Component | Description | Source |
|---|---|---|
| PC-1 | Linear poly(bisphenol A carbonate), Mw = 20,000-22,000 g/mole per GPC using polystyrene standards and calculated for polycarbonate | SABIC |
| PC-2 | Linear bisphenol A polycarbonate, CAS Reg. No, 25971-63-5, having a molecular weight (Mw) of 30,000-31,000 g/mole, as determined by GPC and calculated for polycarbonate, produced by interfacial polymerization and endcapped with p-cumylphenol | SABIC |
| B-PC | Branched bisphenol A homopolymer, containing 0.4 mole % 1,1,1-tris(4-hydroxyphenyl)ethane (THPE) branching agent, having a molecular weight (Mw) of 33,000-35,000 g/mole, as determined by GPC using polystyrene standards and calculated for polycarbonate, produced by interfacial polymerization and endcapped with p-cumylphenol | SABIC |
| H-PC | Branched bisphenol A polycarbonate containing about 3 mole % of THPE as branching agent with 4-hydroxy benzonitrile as endcap, having a molecular weight (Mw) of 26,700-30,700 g/mole, as determined by GPC using polystyrene standards and calculated for polycarbonate, produced by interfacial polymerization and endcapped with p-cumylphenol | SABIC |
| PCR-PC | Post-consumer recycled or post-industrial recycled polycarbonate | Fenghua Hongyu Plastics Co. |
| PC-Si-6 | PDMS (polydimethylsiloxane)-Bisphenol A polycarbonate copolymer, 6 wt % siloxane, average PDMS block length 45 units (D45), Mw 20,000 to 24,000 g/mole as determined by GPC using polystyrene standards and calculated for polycarbonate, eugenol end-capped | SABIC |
| PC-Si-20 | PDMS (polydimethylsiloxane)-Bisphenol A polycarbonate copolymer, 20 wt % siloxane, average PDMS block length 45 units (D45), Mw 29,000 to 31,000 g/mole as determined by GPC using polystyrene standards and calculated for polycarbonate, eugenol end-capped | SABIC |
| PC-Si-40-1 | Polycarbonate-siloxane copolymer having a siloxane content of 40 wt %, average PDMS block length of 45 units, having a Mw of 37,000 to 38,000 g/mole as determined by GPC using polystyrene standards and calculated for polycarbonate, produced by interfacial polymerization and endcapped with p-cumylphenol | SABIC |
| PC-Si-40-2 | Polycarbonate-siloxane copolymer having a siloxane content of 40 wt %, average PDMS block length of 45 units, having a Mw of about 28,000 to 30,000 g/mole as determined by GPC using polystyrene standards and calculated for polycarbonate, produced by interfacial polymerization and endcapped with p-cumylphenol | SABIC |

TABLE 1-continued

| Component | Description | Source |
|---|---|---|
| PC-Si-40-3 | Polycarbonate-siloxane copolymer having a siloxane content of 40 wt %, average PDMS block length of 45 units, having a Mw of about 43,000 to 45,000 g/mole, as determined by GPC using polystyrene standards and calculated for polycarbonate, produced by interfacial polymerization and endcapped with p-cumylphenol | SABIC |
| PPZ | Bis(phenoxy)phosphazene oligomer, CAS Reg. No. 28212-48-8; obtained as FP-110 | Fushimi |
| STAB | Phosphite Stabilizer, available as IRGAPHOS 168 | BASF |

The testing samples were prepared as described below and the following test methods were used.

Typical compounding procedures are described as follows: The various formulations were prepared by direct dry-blending of the raw materials and homogenized with a paint shaker prior to compounding. The formulations were compounded on a 25 mm Werner Pfleiderer ZSK co-rotating twin-screw extruder. A typical extrusion profile is listed in Table 2.

TABLE 2

| Parameters | Unit | 25 mm ZSK |
|---|---|---|
| Feed temperature | ° C. | 177 |
| Zone 1 temperature | ° C. | 232 |
| Zone 2-8 temperature | ° C. | 266 |
| Die temperature | ° C. | 271 |
| Screw speed | rpm | 400 |
| Throughput | kg/h | 70 |
| Torque | % | 75-80 |

A DEMAG molding machine was used to mold the test parts for standard physical property testing. (for parameters see Table 3).

TABLE 3

| Parameters | Unit | |
|---|---|---|
| Pre-drying time | h | 4 |
| Pre-drying temperature | ° C. | 120 |
| Zone 1-3 temperature | ° C. | 290 |
| Nozzle temperature | ° C. | 290 |
| Mold temperature | ° C. | 82 |
| Screw speed | rpm | 100 |
| Back pressure | bar | 3.4 |
| Injection time | s | 1-2 |
| Approx. cycle time | s | 31-35 |

Sample preparation and testing methods are described in Table 4.

TABLE 4

| Property | Standard | Conditions | Specimen |
|---|---|---|---|
| Melt volume rate (MVR) | ASTM D1238-04 | 300° C., 1.2 kg, 6 min | Pellets |
| High shear viscosity | ISO11443 | 300° C. | Pellets |

TABLE 4-continued

| Property | Standard | Conditions | Specimen |
|---|---|---|---|
| Heat deformation temperature (HDT) | ASTM D648 | 0.45 MPa, 1.82 MPa | 3.18 mm bars |
| Ductility | ASTM 256 | 23° C. | 3.18 mm bars |
| Notched Izod Impact Strength | ASTM 256 | 23° C. | 3.18 mm bars |
| Tensile properties | ASTM D638 | 23° C., 50 mm/min | 3.18 mm bars |
| Transmission | ASTM D1003 | 23° C. | 2.5 mm plaques |
| Haze | ASTM D1003 | 23° C. | 2.5 mm plaques |
| Appearance | | | 3.2 mm thick disk, 100 mm diameter |

Flammability tests were performed on samples at a thickness of 1.5 mm, 1.0 mm, and 0.8 mm in accordance with the Underwriter's Laboratory (UL) UL 94 standard. In some cases, a second set of 5 bars was tested to give an indication of the robustness of the rating. In this report the following definitions are used as shown in Table 5. Total flame-out-times for all 5 bars (FOT=t1+t2) were determined. V-ratings were obtained for every set of 5 bars.

TABLE 5

| | $t_1$ and/or $t_2$ | 5-bar FOT | burning drips |
|---|---|---|---|
| V-0 | <10 | <50 | No |
| V-1 | <30 | <250 | No |
| V-2 | <30 | <250 | Yes |
| N.R. (no rating) | >30 | >250 | |

The transparency of each disk was determined by visual inspection. A score of 1-6 was assigned based on the appearance to the naked eye according to Table 6 below.

TABLE 6

| | |
|---|---|
| Transparent, very clear | 1 |
| Transparent, some haze | 2 |
| Translucent, able to read through | 3 |
| Translucent, significant haze | 4 |
| Translucent, very high haze | 5 |
| Opaque | 6 |

Examples 1-9

Table 7 shows the compositions and properties for the following comparative examples, indicated with an asterisk.

TABLE 7

| Item | Unit | 1* | 2* | 3* | 4* | 5* | 6* | 7* | 8* | 9* |
|---|---|---|---|---|---|---|---|---|---|---|
| PC-2 | wt % | 43.84 | 43.84 | 43.84 | 43.84 | 43.84 | 43.84 | 43.84 | 43.84 | 43.84 |
| B-PC | wt % | 14.61 | 14.61 | 14.61 | 14.61 | 14.61 | 9.74 | 9.74 | 9.74 | 9.74 |
| H-PC | wt % | 29.23 | 29.23 | 29.23 | 29.23 | 29.23 | 29.23 | 29.23 | 29.23 | 29.23 |
| PC-Si-40-1 | wt % | 9.74 | 4.87 | 4.87 | — | — | 9.74 | 9.74 | 4.87 | — |
| PC-Si-20 | wt % | — | 4.87 | — | 9.74 | 4.87 | 4.87 | — | 9.74 | 14.61 |
| PC-Si-6 | wt % | — | — | 4.87 | — | 4.87 | — | 4.87 | — | — |

TABLE 7-continued

| Item | Unit | 1* | 2* | 3* | 4* | 5* | 6* | 7* | 8* | 9* |
|---|---|---|---|---|---|---|---|---|---|---|
| PPZ | wt % | 2.50 | 2.50 | 2.50 | 2.50 | 2.50 | 2.50 | 2.50 | 2.50 | 2.50 |
| STAB | wt % | 0.08 | 0.08 | 0.08 | 0.08 | 0.08 | 0.08 | 0.08 | 0.08 | 0.08 |
| Total | wt % | 100 | 100 | 100 | 100 | 100 | 100 | 100 | 100 | 100 |
| Total branching | mole % | 1.46 | 1.46 | 1.46 | 1.46 | 1.46 | 1.27 | 1.27 | 1.27 | 1.27 |
| Total Siloxane Content | wt % | 3.90 | 3.90 | 2.24 | 3.90 | 3.90 | 2.24 | 4.19 | 5.85 | 2.92 |
| Siloxane content from PC-Si-40-1 | wt % | 3.90 | 1.95 | 1.95 | — | — | 3.90 | 3.9 | 1.95 | — |
| Siloxane content from PC-Si-20 | wt % | — | 1.95 | — | 3.90 | 1.95 | 1.95 | — | 3.90 | 2.92 |
| Siloxane content from PC-Si-6 | wt % | — | — | 0.29 | — | 0.29 | — | 0.29 | — | — |
| Ratio of Si content provided by PC-Si-40-1:PC-Si-6 | | — | — | 6.7:1 | — | — | — | 13.4:1 | — | — |
| MFR (300° C., 1.2 kg) | $cm^3$/ 10 min | 4.4 | 4.8 | 5.6 | 5.4 | 6.4 | 4.9 | 4.7 | 5.1 | 5.5 |
| UL-94, 0.8 mm | | V-0 | V-0 | V-2 | V-2 | V-2 | V-0 | V-0 | V-0 | V-0 |
| Appearance, 3.2 mm disk | | 6 | 4 | 3 | 6 | 4 | 6 | 5 | 4 | 6 |
| NII, 23° C. | J/m | 839 | 836 | 790 | 788 | 806 | 848 | 781 | 872 | 873 |
| Tg | | 146 | 143 | 146 | 143 | 145 | 144 | 145 | 143 | 146 |

Table 7 shows compositions including a combination of linear BPA homopolycarbonate (PC), branched homopolycarbonate (B-PC), highly branched polycarbonate (H-PC) with a 4-hydroxy benzonitrile (HBN) functional group, a poly(carbonate-siloxane) composition including a poly(carbonate siloxane) having a siloxane content of 6 wt %, a poly(carbonate siloxane) having a siloxane content of 20 wt %, a poly(carbonate siloxane) having a siloxane content of 40 wt %, or a combination thereof and a phosphazene flame retardant. The poly(carbonate siloxane)s were used alone and in combination with each other. Comparative Example 1 that includes only PC-Si-40-1 as a poly(carbonate-siloxane) attained a V-0 flame test rating, but failed to provide the transparency rating of 1-3. Comparative Example 4 that includes only PC-Si-20 as a poly(carbonate-siloxane) attained a V-2 flame test rating, and failed to improve the transparency rating. Increasing the loading in the PC-Si-20 only example from 9.74 wt % to 14.61 wt % failed to improve the transparency rating (compare Comparative Example 9 with Comparative Example 6).

Combinations of PC-Si-40-1 and PC-Si-20 also failed to provide the desired flame testing rating of at least V-1 and a transparency rating of 1-3. For instance, the combination of PC-Si-40-1 and PC-Si-20 in a 1:1 weight ratio provided a V-0 flame test rating and improved the transparency rating from 6 to 4 (compare Comparative Example 3 with Comparative Example 1). Increasing the ratio of PC-Si-40-1 to PC-Si-20 from to 2:1 (Comparative Example 7) resulted maintaining the V-0 flame test rating, but the transparency rating was slightly decreased to 5 from 6.

Combinations of PC-Si-40-1 or PC-Si-20 with PC-Si-6 shown in Table 7 also failed to provide the desired flame testing rating of at least V-1 and a transparency rating of 1-3. In fact, the combination of PC-Si-40-1 and PC-Si-6 in a 1:1 weight ratio (see Comparative Example 3) adversely affected the flame test rating as compared with the Comparative Example 1 where PC-Si-40-1 was used alone (i.e., from V-0 to V-2). However, incorporation of PC-Si-6 improved the transparency rating from 6 to 3 (see Comparative Example 3). The combination of PC-Si-20 and PC-Si-6 in a 1:1 weight ratio (see Comparative Example 5) resulted in a modest improvement in the transparency rating (from 6 to 4), but failed to improve the flame test rating.

Examples 10-17

Table 8 shows the compositions and properties for the following comparative examples and examples. Comparative examples are indicated with an asterisk.

TABLE 8

| Item | Unit | 10 | 11* | 12* | 13* | 14* | 15* | 16 | 17* |
|---|---|---|---|---|---|---|---|---|---|
| PC-2 | wt % | 43.84 | 43.84 | 43.84 | 43.84 | 48.71 | 48.71 | 48.71 | 48.71 |
| B-PC | wt % | 9.74 | 9.74 | 9.74 | 9.74 | — | — | — | — |
| H-PC | wt % | 29.23 | 29.23 | 29.23 | 29.23 | 34.10 | 34.10 | 34.10 | 34.10 |
| PC-Si-40-1 | wt % | 4.87 | — | — | — | 9.74 | — | 4.87 | — |
| PC-Si-20 | wt % | — | 9.74 | 4.87 | — | 4.87 | 14.61 | — | 4.87 |
| PC-Si-6 | wt % | 9.74 | 4.87 | 9.74 | 14.61 | — | — | 9.74 | 9.74 |
| PPZ | wt % | 2.50 | 2.50 | 2.50 | 2.50 | 2.50 | 2.50 | 2.50 | 2.50 |
| STAB | wt % | 0.08 | 0.08 | 0.08 | 0.08 | 0.08 | 0.08 | 0.08 | 0.08 |
| Total | wt % | 100 | 100 | 100 | 100 | 100 | 100 | 100 | 100 |
| Properties | | | | | | | | | |
| Total Branching | mole % | 1.27 | 1.27 | 1.27 | 1.27 | 1.02 | 1.02 | 1.02 | 1.02 |
| Total Siloxane content | wt % | 2.53 | 2.24 | 1.56 | 0.88 | 4.88 | 2.92 | 2.53 | 1.56 |

TABLE 8-continued

| Item | Unit | 10 | 11* | 12* | 13* | 14* | 15* | 16 | 17* |
|---|---|---|---|---|---|---|---|---|---|
| Siloxane content from PC-Si-40-1 | wt % | 1.95 | — | — | — | 3.90 | — | 1.95 | — |
| Siloxane content from PC-Si-20 | wt % | — | 1.95 | 0.98 | — | 0.98 | 2.92 | — | 0.974 |
| Siloxane content from PC-Si-6 | wt % | 0.58 | 0.29 | 0.58 | 0.88 | — | — | 0.58 | 0.58 |
| Ratio of Si content provided by PC-Si-40-1:PC-Si-6 | | 3.4:1 | — | — | — | — | — | 3.4:1 | — |
| MFR, 300° C., 1.2 kg | $cm^3$/ | 6.2 | 6.3 | 6.8 | 7.4 | 5.10 | 5.13 | 7.52 | 8.21 |
| UL-94, 0.8 mm | 10 min | V-0 | V-0 | V-2 | V-2 | V-2 | V-0 | V-0 | V-0 |
| Appearance, 3.2 mm disk | | 3 | 5 | 4 | 1 | 6 | 6 | 3 | 4 |
| NII | J/m | 786 | 798 | 788 | 726 | 830 | 837 | 813 | 815 |
| Tg | ° C. | 144 | 14 | 139 | 142 | 145 | 145 | 143 | 143 |

Table 8 shows compositions including a combination of linear BPA homopolycarbonate (PC), highly branched polycarbonate (H-PC), a poly(carbonate siloxane composition including PC-Si-6, PC-Si-20, PC-Si-40-1, or a combination thereof, a phosphazene flame retardant, and optionally, a branched homopolycarbonate (B-PC).

In the compositions including B-PC, PC-Si-6 was used alone or in combination with PC-Si-20 or PC-Si-40-1. Comparative Example 14 that includes PC-Si-6 alone, failed to provide the desired flame testing rating or transparency rating (i.e., V-2), but demonstrated a dramatic improvement in the transparency rating (i.e., 1). When used in combination with PC-Si-20, at a 2:1 weight ratio of PC-Si-20 to PC-Si-6, this resulted in retention of the V-0 flame test rating and a decrease in the transparency rating (from 3 to 5) (compare Example 11 with Comparative Example 12), whereas a 1:2 weight ratio resulted in a loss in the flame test rating and a decrease in the transparency rating (compare Example 11 with Comparative Example 13). The combination of PC-Si-40-1 with PC-Si-6 in a 1:2 ratio provided the desired combination of properties. When B-PC was not present, similar trends were observed for the various combinations of poly(carbonate-siloxane)s as compared with compositions where B-PC was present.

Table 9 shows the compositions and properties for the following comparative examples and examples. Comparative examples are indicated with an asterisk.

TABLE 9

| Item | Unit | 19* | 20* | 21* | 22 | 23* |
|---|---|---|---|---|---|---|
| PC-2 | wt % | 43.61 | 43.61 | 43.61 | 43.61 | 43.61 |
| B-PC | wt % | 9.69 | 9.69 | 9.69 | 9.69 | 9.69 |
| H-PC | wt % | 29.08 | 29.08 | 29.08 | 29.08 | 29.08 |
| PC-Si-40-1 | wt % | 9.69 | 9.69 | — | 4.85 | — |
| PC-Si-20 | wt % | 4.85 | — | 14.54 | — | — |
| PC-Si-6 | wt % | — | 4.85 | — | 9.69 | 14.54 |
| PPZ | wt % | 3.00 | 3.00 | 3.00 | 3.00 | 3.00 |
| STAB | wt % | 0.08 | 0.08 | 0.08 | 0.08 | 0.08 |
| Total | wt % | 100 | 100 | 100 | 100 | 100 |
| | | Properties | | | | |
| Total Branching | mole % | 0.91 | 0.91 | 0.91 | 0.91 | 0.91 |
| Total Siloxane content | wt % | 4.85 | 4.17 | 2.92 | 2.52 | 0.87 |
| Siloxane content from PC-Si-40-1 | wt % | 3.88 | 3.88 | — | 1.94 | — |
| Siloxane content from PC-Si-20 | wt % | 0.97 | — | 2.91 | — | — |
| Siloxane content from PC-Si-6 | wt % | — | 0.29 | — | 0.58 | 0.87 |
| Ratio of Si content of PC-Si-40-1:PC-Si-6 | | — | 13.4:1 | — | 3.3:1 | — |
| MFR (300° C., 1.2 kg) | $cm^3$/ | 4.9 | 5.2 | 5.5 | 6.4 | 7.6 |
| UL-94, 0.8 mm | 10 min | V-0 | V-0 | V-0 | V-0 | V-2 |
| Appearance, 3.2 mm disk | | 6 | 4 | 6 | 2 | 1 |
| NII | J/m | 862 | 860 | 875 | 850 | 725 |
| Tg | ° C. | 142 | 143 | 145 | 141 | 142 |

Table 9 shows compositions including a combination of linear BPA homopolycarbonate (PC-2), a branched homopolycarbonate (B-PC), highly branched polycarbonate (H-PC), a poly(carbonate siloxane composition including PC-Si-6, PC-Si-20, PC-Si-40-1, or a combination thereof, and a higher loading of flame retardant than was used in the compositions of Tables 7 and 8. Similar trends were observed for the 2.5 wt % and 3 wt % PPZ compositions.

Table 10 shows the compositions and properties for the following examples.

TABLE 10

| Formulation | | 24 | 25 | 26 | 27 | 28 | 29 | 30 | 31 | 32 |
|---|---|---|---|---|---|---|---|---|---|---|
| PC-2 | wt % | 43.62 | 43.62 | 43.62 | 43.62 | 43.62 | 43.62 | 43.62 | 43.62 | 43.62 |
| B-PC | wt % | 9.70 | 9.70 | 9.70 | 9.70 | 9.70 | 9.70 | 9.70 | 9.70 | 9.70 |
| H-PC | wt % | 29.10 | 29.10 | 29.10 | 29.10 | 29.10 | 29.10 | 29.10 | 29.10 | 29.10 |
| PC-Si-6 | wt % | 9.70 | 12.50 | 13.50 | 9.70 | 12.50 | 13.50 | 9.70 | 12.50 | 13.50 |
| PC-Si-40-2 | wt % | 4.80 | 2.00 | 1.00 | — | — | — | — | — | — |
| PC-Si-40-1 | wt % | — | — | — | 4.80 | 2.00 | 1.00 | — | — | — |
| PC-Si-40-3 | wt % | — | — | — | — | — | — | 4.80 | 2.00 | 1.00 |
| STAB | wt % | 0.08 | 0.08 | 0.08 | 0.08 | 0.08 | 0.08 | 0.08 | 0.08 | 0.08 |
| Total Weight | wt % | 100 | 100 | 100 | 100 | 100 | 100 | 100 | 100 | 100 |
| Properties | | | | | | | | | | |
| Total siloxane content | wt % | 2.48 | 1.55 | 1.21 | 2.48 | 1.55 | 1.21 | 2.48 | 1.55 | 1.21 |
| Total branching | mole % | 0.91 | 0.91 | 0.91 | 0.91 | 0.91 | 0.91 | 0.91 | 0.91 | 0.91 |
| PPZ | wt % | 3.00 | 3.00 | 3.00 | 3.00 | 3.00 | 3.00 | 3.00 | 3.00 | 3.00 |
| Siloxane content from PC-Si-6 | wt % | 0.58 | 0.75 | 0.81 | 0.58 | 0.75 | 0.81 | 0.58 | 0.75 | 0.81 |
| Ratio of Si content provided by PC-Si-40-1, -2,and -3:PC-Si-6 | wt % | 3.28:1 | 1.1:1 | 1:2 | 3.28:1 | 1.1:1 | 1:2 | 3.28:1 | 1.1:1 | 1:2 |
| Glass Transition Temp | ° C. | 140 | 141 | 140 | 118 | 145 | 140 | 143 | 142 | 142 |
| Melt Viscosity - ISO11443 at apparent shear rate 640/s | Pa · s | 587 | 564 | 572 | 611 | 551 | 593 | 609 | 585 | 583 |
| UL94 Flame Class Rating at 0.8 mm | — | V-1 | V-0 | V-1 | V-0 | V-0 | V-1 | V-0 | V-1 | V-0 |
| Number of dripping parts (all 10 tested parts) | # | 0 | 2 | 1 | 0 | 0 | 3 | 0 | 0 | 0 |
| Total FOT (all 10 tested parts) | s | 67 | 84 | 64 | 36 | 39 | 67 | 30 | 50 | 25 |
| UL94 Flame Test Rating at 0.6 mm | | V-0 | V-2 | V-2 | V-1 | V-0 | V-0 | V-1 | V-2 | V-0 |
| Number of dripping parts (all 10 tested parts) | # | 2 | 8 | 10 | 0 | 5 | 13 | 0 | 4 | 6 |
| Total FOT (all 10 tested parts) | s | 269 | 228 | 230 | 104 | 92 | 248 | 120 | 144 | 298 |
| Max FOT (all 10 tested parts) | s | 35 | 28 | 25 | 15 | 10 | 35 | 15 | 15 | 35 |
| Notched Izod at 23° C. - ASTM - Impact Strength | J/m | 859 | 834 | 822 | 843 | 849 | 818 | 838 | 832 | 843 |
| Notched Izod at 23° C. - ASTM - Ductility | % | 100 | 100 | 100 | 100 | 100 | 100 | 100 | 100 | 100 |
| Notched Izod at 0° C. - ASTM - Impact Strength | J/m | 707 | 607 | 200 | 760 | 651 | 264 | 779 | 705 | 693 |
| Notched Izod at 0° C. - ASTM - Ductility | % | 100 | 100 | 0 | 100 | 100 | 20 | 100 | 100 | 100 |
| Notched Izod at -30° C. - ASTM - Impact Strength | J/m | 191 | 153 | X | 392 | 168 | 160 | 577 | 179 | 189 |
| Notched Izod at -30° C. - ASTM - Ductility | % | 0 | 0 | X | 0 | 0 | 0 | 100 | 0 | 0 |
| Transmission, 2.5 mm thick part | % | 72.6 | 84.2 | 88.1 | 65.4 | 80.1 | 85.2 | 68.1 | 79.4 | 79.4 |
| Haze, 2.5 mm thick part | % | 17.1 | 4.4 | 2.2 | 32.3 | 7.2 | 3.6 | 26.9 | 8.1 | 8.1 |
| Transmission, 0.8 mm thick part | % | 88.3 | 90.7 | 91.6 | 85.6 | 89.6 | 91.1 | 85.4 | 89.0 | 89.1 |
| Haze, 0.8 mm thick part | % | 3.8 | 1.6 | 1.1 | 7.1 | 2.3 | 1.5 | 7.2 | 2.7 | 2.6 |
| Tensile test - ASTM D 638, Uniaxial tensile test | | | | | | | | | | |

TABLE 10-continued

| Formulation | | 24 | 25 | 26 | 27 | 28 | 29 | 30 | 31 | 32 |
|---|---|---|---|---|---|---|---|---|---|---|
| Modulus of Elasticity | MPa | 2178 | 2194 | 2210 | 2142 | 2190 | 2174 | 2134 | 2164 | 2164 |
| Tensile Strength at Yield | MPa | 60.2 | 61.4 | 61.4 | 59.1 | 60.1 | 60.5 | 58.5 | 59.6 | 59.9 |
| Tensile Strength at Break | MPa | 58.5 | 61.4 | 62.2 | 58.6 | 58.3 | 58.8 | 59 | 52.8 | 60 |
| % Elongation at Yield | % | 6.3 | 6.3 | 6.4 | 6.2 | 6.3 | 6.3 | 6.2 | 6.2 | 6.3 |
| % Elongation at Break | % | 96 | 103 | 102 | 100 | 97 | 101 | 98 | 76 | 98 |
| After exposure to BANANA BOAT sunscreen at 1% Strain, for 3 days, at room temperature: | | | | | | | | | | |
| Tensile Strength at Yield | MPa | 60.5 | 12 | 37 | 60.8 | 61.3 | 37 | 59.8 | 25 | 37 |
| Elongation at Break | % | 93 | 20 | 55 | 94 | 94 | 59 | 97 | 36 | 57 |
| Retention of Tensile Strength at Yield | % | 100 | 20** | 60** | 103 | 102 | 61** | 102 | 41** | 61** |
| Retention of Elongation at Break | % | 98 | 19** | 54** | 94 | 97 | 58** | 99 | 47** | 58** |

The compositions of Tables 7-9 established that the combination of PC-Si-40-1 and PC-Si-6, wherein the loading of PC-Si-6 is greater than PC-Si-40-1 provides the desired combination of flame test rating of V-0 and transparency rating of 1-3. The compositions of Table 9 show the effect of varying the ratio to a ratio greater than 2:1 (PC-Si-6 to PC-Si-40-1) and varying the molecular weight of the poly (carbonate siloxane) having a siloxane content of 40 wt % (i.e., PC-Si-40-1 to PC-Si-40-3). The total siloxane content of the compositions ranged from 1.21 wt % to 2.5 wt %. All of the examples provided at least a rating of V-1 at 0.8 mm and % transmission of at least 65%. Examples 24, 27, 28 and 30 provided good chemical resistance, whereas Examples 25-26, 29, and 31-32 did not, as indicated by two asterisks.

Table 11 shows the flow properties for select compositions. Comparative examples are indicated with an asterisk.

TABLE 11

| Formulation | DSC, $T_g$ (° C.) | MFR, 300° C. @ 1.2 kg ($cm^3$/10 min) | Spiral Flow Condition 60 mil; 555° F., 180° F. (in.) |
|---|---|---|---|
| PC-2 | 153.62 | 7.2 | 4.75 |
| B-PC | 154.22 | 1.1 | 4.0 |

TABLE 11-continued

| Formulation | DSC, $T_g$ (° C.) | MFR, 300° C. @ 1.2 kg ($cm^3$/10 min) | Spiral Flow Condition 60 mil; 555° F., 180° F. (in.) |
|---|---|---|---|
| H-PC | 144.04 | 10.9 | 9.5 |
| 6* | 142.5 | 4.7 | 6.5 |
| 9* | 142.3 | 5.9 | 6.5 |
| 10 | 142.2 | 6.5 | 6.75 |
| 12* | 142 | 7.9 | 6.75 |

Table 11 shows the flow properties for each of PC-2, B-PC, and H-PC alone as compared with Comparative Exampled 6, 9, and 12 and Example 10. It was confirmed that Example 10 has a good combination of MFR and spiral flow. In particular, the MFR is similar to that of PC-2 alone, but the spiral flow length was increased by 2 inches.

Table 12 shows the properties for the following comparative examples and examples. Comparative examples are indicated with an asterisk.

TABLE 12

| Formulation | | 33* | 34* | 35* | 36* | 37* | 38* | 39 | 40 | 41 |
|---|---|---|---|---|---|---|---|---|---|---|
| PC-2 | wt % | 33.92 | 24.23 | 14.54 | 33.92 | 24.23 | 14.54 | 33.92 | 24.23 | 14.54 |
| B-PC | wt % | 9.69 | 9.69 | 9.69 | 9.69 | 9.69 | 9.69 | 9.69 | 9.69 | 9.69 |
| H-PC | wt % | 29.08 | 29.08 | 29.08 | 29.08 | 29.08 | 29.08 | 29.08 | 29.08 | 29.08 |
| PCR-PC | wt % | 9.69 | 19.38 | 29.08 | 9.69 | 19.38 | 29.08 | 9.69 | 19.38 | 29.08 |
| PC-Si-6 | wt % | 4.85 | 4.85 | 4.85 | — | — | — | 9.69 | 9.69 | 9.69 |
| PC-Si-20 | wt % | — | — | — | 14.54 | 14.54 | 14.54 | — | — | — |
| PC-Si-40-1 | wt % | 9.69 | 9.69 | 9.69 | — | — | — | 4.85 | 4.85 | 4.85 |
| PPZ | wt % | 3.00 | 3.00 | 3.00 | 3.00 | 3.00 | 3.00 | 3.00 | 3.00 | 3.00 |
| STAB | wt % | 0.08 | 0.08 | 0.08 | 0.08 | 0.08 | 0.08 | 0.08 | 0.08 | 0.08 |
| Total | wt % | 100 | 100 | 100 | 100 | 100 | 100 | 100 | 100 | 100 |
| Properties | | | | | | | | | | |
| Total branching | mole % | 0.91 | 0.91 | 0.91 | 0.91 | 0.91 | 0.91 | 0.91 | 0.91 | 0.91 |
| Siloxane content from PC-Si-40-1 | wt % | 3.88 | 3.88 | 3.88 | — | — | — | 1.94 | 1.94 | 1.94 |
| Siloxane content from PC-Si-6 | wt % | 0.29 | 0.29 | 0.29 | — | — | — | 0.58 | 0.58 | 0.58 |
| Ratio of Si content provided by PC-Si-40-1:PC-Si-6 | — | 13.4:1 | 13.4:1 | 13.4:1 | — | — | — | 3.35:1 | 3.35:1 | 3.35:1 |

TABLE 12-continued

| Formulation | | 33* | 34* | 35* | 36* | 37* | 38* | 39 | 40 | 41 |
|---|---|---|---|---|---|---|---|---|---|---|
| Total siloxane content | wt % | 4.17 | 4.17 | 4.17 | 2.91 | 2.91 | 2.91 | 2.52 | 2.52 | 2.52 |
| Tg | ° C. | 143 | 143 | 138 | 141 | 142 | 138 | 140 | 136 | 141 |
| MFR, 300° C., 1.2 kg | $cm^3$/ 10 min | 5.3 | 6.2 | 7.0 | 6.7 | 6.8 | 7.5 | 7.2 | 8.4 | 8.3 |
| UL94 Flame Test Rating at 0.8 mm | — | V-0 | V-0 | V-0 | V-0 | V-0 | V-0 | V-0 | V-0 | V-0 |
| UL94 Flame Test Rating at 1.5 mm | | V-0 | V-0 | V-0 | V-0 | V-0 | V-0 | V-0 | V-0 | V-0 |
| NII, 23° C., Impact Strength | J/m | 859 | 838 | 833 | 873 | 857 | 842 | 844 | 845 | 808 |
| NII, 23° C., Ductility | % | 100 | 100 | 100 | 100 | 100 | 100 | 100 | 100 | 100 |
| Transmission, 0.8 mm thick part | % | 75 | 76 | 75 | 73 | 71 | 70 | 83 | 84 | 85 |
| Haze, 0.8 mm thick part | % | 28 | 27 | 29 | 39 | 44 | 45 | 10 | 9 | 7 |

Table 12 shows compositions that include post-consumer recycled polycarbonate (PCR-PC). The results are consistent with the compositions not having PCR-PC in that the 1:2 weight ratio of PC-Si-40-1 to PC-Si-6 provided the desired combination of a V-0 flame test rating and transparency.

This disclosure further encompasses the following aspects.

Aspect 1. A thermoplastic composition comprising a highly branched polycarbonate comprising 1.5-5.0 mole % branching, wherein the highly branched polycarbonate has a weight average molecular weight of 25,000-45,000 grams per mole, as determined by gel permeation chromatography, according to polystyrene standards and calculated for polycarbonate; a branched polycarbonate comprising 0.1-1.0 mole % branching, wherein the branched polycarbonate has a weight average molecular weight of 25,000-45,000 grams per mole, as determined by gel permeation chromatography, according to polystyrene standards and calculated for polycarbonate; a first poly(carbonate siloxane) having 30-70 wt % siloxane, a second poly(carbonate siloxane) having 5-15 wt % siloxane, and wherein the total siloxane content provided to the thermoplastic composition by the first and second poly(carbonate-siloxanes) is less than 4.17 wt %; and wherein the ratio of the siloxane content provided to the thermoplastic composition by the first poly(carbonate siloxane) to the siloxane content provided to the thermoplastic composition by the second poly(carbonate siloxane) is less than 6.7 to 1, a flame retardant comprising a phosphorous-nitrogen bond; optionally, an auxiliary polycarbonate.

Aspect 2. The thermoplastic composition of aspect 1, wherein the calculated bromine and chlorine content of the thermoplastic composition are each 900 ppm or less and the calculated total halogen content of the thermoplastic composition is 1500 ppm or less; or the calculated bromine, chlorine, and fluorine content of the thermoplastic composition are each 900 ppm or less and the calculated total bromine, chlorine, and fluorine content of the thermoplastic composition is 1500 ppm or less.

Aspect 3. The thermoplastic composition of aspect 1 or aspect 2, wherein a molded sample of the composition has a percent transmission of at least 80% as determined according to ASTM D1003 on a molded sample having a thickness of 0.8 mm, a UL94 flame test rating of V-0 or V-1 on a molded sample having a thickness of 0.8 mm, and a Notched Izod Impact strength of at least 600 Joules per meter as determined according to ASTM 256 at 23° C.

Aspect 4. The thermoplastic composition of any one of the preceding aspects comprising 20-80 wt % of a highly branched polycarbonate comprising 1.5-5.0 mole % branching, wherein the highly branched polycarbonate has a weight average molecular weight of 25,000-45,000 g/mole, as determined by gel permeation chromatography, according to polystyrene standards and calculated for polycarbonate; up to 10 wt % of a first poly(carbonate siloxane) having 30-70 wt % siloxane, 4-15 wt % of a second poly(carbonate siloxane) having 5 to 15 wt % siloxane, and a flame retardant comprising a phosphorous-nitrogen bond present in an amount effective to provide up to 0.6 wt % phosphorous, based on the total weight of the composition; optionally, up to 70 wt % of an auxiliary polycarbonate.

Aspect 5. The thermoplastic composition of any one of the preceding aspects, wherein the functional groups are derived from an end-capping agent having a pKa between 8.3 and 11.

Aspect 6. The thermoplastic composition of any one of the preceding aspects, wherein the functional groups comprise a phenol substituted with a cyano group, an olefin group, a halogen, an ester group, or a combination thereof.

Aspect 7. The thermoplastic composition of any one of the preceding aspects, wherein the flame retardant comprises a phosphazene, a phosphonitrilic chloride, a phosphorus ester amide, a phosphoric acid amide, a phosphonic acid amide, a phosphinic acid amide, tris(aziridinyl) phosphine oxide, or a combination thereof.

Aspect 8. The thermoplastic composition of any one of the preceding aspects, wherein the flame retardant is of formula (18) or (19)

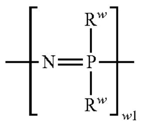

(18)

-continued (19)

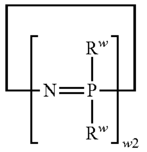

wherein w1 is 3 to 10,000 and w2 is 3 to 25, preferably 3 to 7, and each occurrence of $R^w$ is independently a $C_{1-12}$ alkyl, alkenyl, alkoxy, aryl, aryloxy, or polyoxyalkylene group, wherein at least one hydrogen atom is optionally substituted with a group having an N, S, O, or F atom, or an amino group Aspect 9. The thermoplastic composition of any one of the preceding aspects, wherein the auxiliary polycarbonate comprises 5-15 wt % of a branched homopolycarbonate comprising 0.2-1.0 mole % branching agent; up to 70 wt % of a polycarbonate derived from post-consumer recycled or post-industrial recycled material, up to 70 wt % of a polycarbonate different from the branched homopolycarbonate comprising 0.2-1.0 mole % branching agent and the polycarbonate derived from post-consumer recycled or post-industrial recycled material, or a combination thereof Aspect 10. The thermoplastic composition of any one of the preceding aspects, wherein one or more of the highly branched polycarbonate comprising 1.5-5.0 mole % branching, the poly(carbonate-siloxanes), and the auxiliary polycarbonate are derived from post-consumer recycled or post-industrial recycled materials or can be produced from at least one monomer derived from bio-based or plastic waste feedstock.

Aspect 11. The thermoplastic composition of any one of the preceding aspects comprising 20-80 wt % of highly branched polycarbonate comprising 1.5-5.0 mole % branching, wherein the highly branched polycarbonate has a weight average molecular weight of 25,000-45,000 grams per mole, as determined by gel permeation chromatography, according to polystyrene standards and calculated for polycarbonate; up to 10 wt % of a first poly(carbonate siloxane) having 30-70 wt % siloxane, 4-15 wt % of a second poly(carbonate siloxane) having 5 to 15 wt % siloxane, and a phosphazene flame retardant present in an amount effective to provide up to 0.6 wt % phosphorous; optionally, up to 70 wt % of an auxiliary polycarbonate comprising 5-15 wt % of a branched homopolycarbonate comprising 0.3-1.0 mole % branching agent; up to 70 wt % of a polycarbonate derived from post-consumer recycled or post-industrial recycled material, up to 70 wt % of a polycarbonate different from the branched homopolycarbonate comprising 0.3-1.0 mole % branching agent and the polycarbonate derived from post-consumer recycled or post-industrial recycled material, or a combination thereof.

Aspect 12. The thermoplastic composition of any one of the preceding aspects, comprising 20-80 wt % of highly branched polycarbonate comprising 1.5-5.0 mole % branching, wherein the highly branched polycarbonate has a weight average molecular weight of 25,000-45,000 grams per mole, as determined by gel permeation chromatography, according to polystyrene standards and calculated for polycarbonate; 1-6 wt % of a first poly(carbonate siloxane) having a siloxane content of 30-70 wt %, wherein the first poly(carbonate siloxane) has a weight average molecular weight of 33,000-45,000 grams per mole, as determined by gel permeation chromatography, according to polystyrene standards and calculated for polycarbonate, 5-15 wt % of a second poly(carbonate siloxane) having a siloxane content of 5-15 wt %, and 1-4 wt % of a phosphazene flame retardant; a branched homopolycarbonate comprising 1-10 mole % branching, wherein the branched homopolycarbonate comprises functional groups, optionally, up to 70 wt % of an auxiliary polycarbonate comprising a polycarbonate derived from post-consumer recycled or post-industrial recycled material, a polycarbonate different from the polycarbonate derived from post-consumer recycled or post-industrial recycled material, or a combination thereof.

Aspect 13. A method of making the thermoplastic composition of any one of the preceding aspects, the method comprising melt-mixing the components of the composition.

Aspect 14. The method of aspect 14, further comprising molding, casting, or extruding the composition to provide the article.

Aspect 15. An article comprising the thermoplastic composition of any one of the preceding aspects.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl ($—HC═CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($—CH_2—$) or, propylene ($—(CH_2)_3—$)). "Cycloalkylene" means a divalent cyclic alkylene group, $—C_nH_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro ($—NO_2$), a cyano (—CN), a $C_{1-6}$ alkyl sulfonyl ($—S(═O)_2$-alkyl), a $C_{6-12}$ aryl sulfonyl ($—S(═O)_2$-aryl)a thiol (—SH), a thiocyano (—SCN), a tosyl ($CH_3C_6H_4SO_2—$), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example $—CH_2CH_2CN$ is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A thermoplastic composition comprising a highly branched polycarbonate comprising 1.5-5.0 mole % branching, wherein the highly branched polycarbonate has a weight average molecular weight of 25,000-45,000 grams per mole, as determined by gel permeation chromatography, according to polystyrene standards and calculated for polycarbonate;

a branched polycarbonate comprising 0.1-1.0 mole % branching, wherein the branched polycarbonate has a weight average molecular weight of 25,000-45,000 grams per mole, as determined by gel permeation chromatography, according to polystyrene standards and calculated for polycarbonate;

a first poly (carbonate siloxane) having 30-70 wt % siloxane, a second poly (carbonate siloxane) having 5-15 wt % siloxane, and wherein the total siloxane content provided to the thermoplastic composition by the first and second poly (carbonate-siloxanes) is less than 4.17 wt %; and wherein the ratio of the siloxane content provided to the thermoplastic composition by the first poly (carbonate siloxane) to the siloxane content provided to the thermoplastic composition by the second poly (carbonate siloxane) is less than 6.7 to 1, a flame retardant comprising a phosphorous-nitrogen bond;

optionally, an auxiliary polycarbonate;

wherein a molded sample of the composition has a percent transmission of at least 80% as determined according to ASTM D1003 on a molded sample having a thickness of 0.8 mm.

2. The thermoplastic composition of claim 1, wherein the calculated bromine and chlorine content of the thermoplastic composition are each 900 ppm or less and the calculated total halogen content of the thermoplastic composition is 1500 ppm or less; or the calculated bromine, chlorine, and fluorine content of the thermoplastic composition are each 900 ppm or less and the calculated total bromine, chlorine, and fluorine content of the thermoplastic composition is 1500 ppm or less.

3. The thermoplastic composition of claim 1, wherein a molded sample of the composition has a UL94 flame test rating of V-0 or V-1 on a molded sample having a thickness of 0.8 mm, and a Notched Izod Impact strength of at least 600 Joules per meter as determined according to ASTM 256 at 23° C.

4. The thermoplastic composition of claim 1 comprising:

20-80 wt % of a highly branched polycarbonate comprising 1.5-5.0 mole % branching, wherein the highly branched polycarbonate has a weight average molecular weight of 25,000-45,000 g/mole, as determined by gel permeation chromatography, according to polystyrene standards and calculated for polycarbonate;

up to 10 wt % of a first poly (carbonate siloxane) having 30-70 wt % siloxane, 4-15 wt % of a second poly (carbonate siloxane) having 5 to 15 wt % siloxane, and a flame retardant comprising a phosphorous-nitrogen bond present in an amount effective to provide up to 0.6 wt % phosphorous, based on the total weight of the composition;

optionally, up to 70 wt % of an auxiliary polycarbonate.

5. The thermoplastic composition of claim 1, wherein the highly branched polycarbonate comprises functional groups are derived from an end-capping agent having a pKa between 8.3 and 11.

6. The thermoplastic composition of claim 1, wherein the highly branched polycarbonate comprises functional groups derived from a phenol substituted with a cyano group, an olefin group, a halogen, an ester group, or a combination thereof.

7. The thermoplastic composition of claim 1, wherein the flame retardant is a phosphazene, a phosphonitrilic chloride, a phosphorus ester amide, a phosphoric acid amide, a phosphonic acid amide, a phosphinic acid amide, tris (aziridinyl) phosphine oxide, or a combination thereof.

8. The thermoplastic composition of claim 1, wherein the flame retardant is of formula (18) or (19)

(18)

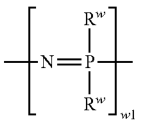

(19)

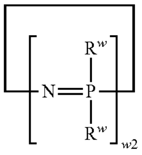

wherein w1 is 3 to 10,000 and w2 is 3 to 25, preferably 3 to 7, and each occurrence of $R^w$ is independently a $C_{1-12}$ alkyl, alkenyl, alkoxy, aryl, aryloxy, or polyoxyalkylene group, wherein at least one hydrogen atom is optionally substituted with a group having an N, S, O, or F atom, or an amino group.

9. The thermoplastic composition of claim 1, wherein the auxiliary polycarbonate is present and comprises 5-15 wt % of a branched homopolycarbonate comprising 0.2-1.0 mole % branching agent;

up to 70 wt % of a polycarbonate derived from post-consumer recycled or post-industrial recycled material, up to 70 wt % of a polycarbonate different from the branched homopolycarbonate comprising 0.2-1.0 mole % branching agent and the polycarbonate derived from post-consumer recycled or post-industrial recycled material, or a combination thereof.

10. The thermoplastic composition of claim 1, wherein one or more of the highly branched polycarbonate comprising 1.5-5.0 mole % branching, the poly (carbonate-siloxanes), and the auxiliary polycarbonate are derived from post-consumer recycled or post-industrial recycled materials or can be produced from at least one monomer derived from bio-based or plastic waste feedstock.

11. The thermoplastic composition of claim 1 comprising:

20-80 wt % of highly branched polycarbonate comprising 1.5-5.0 mole % branching, wherein the highly branched polycarbonate has a weight average molecular weight of 25,000-45,000 grams per mole, as determined by gel permeation chromatography, according to polystyrene standards and calculated for polycarbonate;

up to 10 wt % of a first poly (carbonate siloxane) having 30-70 wt % siloxane, 4-15 wt % of a second poly (carbonate siloxane) having 5 to 15 wt % siloxane, and a phosphazene flame retardant present in an amount effective to provide up to 0.6 wt % phosphorous;

optionally, up to 70 wt % of an auxiliary polycarbonate comprising 5-15 wt % of a branched homopolycarbonate comprising 0.3-1.0 mole % branching agent;

up to 70 wt % of a polycarbonate derived from post-consumer recycled or post-industrial recycled material, up to 70 wt % of a polycarbonate different from the branched homopolycarbonate comprising 0.3-1.0 mole % branching agent and the polycarbonate derived from post-consumer recycled or post-industrial recycled material, or a combination thereof.

12. The thermoplastic composition of claim 1 comprising:

20-80 wt % of highly branched polycarbonate comprising 1.5-5.0 mole % branching, wherein the highly branched polycarbonate has a weight average molecular weight of 25,000-45,000 grams per mole, as determined by gel permeation chromatography, according to polystyrene standards and calculated for polycarbonate;

1-6 wt % of a first poly (carbonate siloxane) having a siloxane content of 30-70 wt %, wherein the first poly (carbonate siloxane) has a weight average molecular weight of 33,000-45,000 grams per mole, as determined by gel permeation chromatography, according to polystyrene standards and calculated for polycarbonate, 5-15 wt % of a second poly (carbonate siloxane) having a siloxane content of 5-15 wt %, and 1-4 wt % of a phosphazene flame retardant;

a branched homopolycarbonate comprising 1-10 mole % branching, wherein the branched homopolycarbonate comprises functional groups, optionally, up to 70 wt % of an auxiliary polycarbonate comprising a polycarbonate derived from post-consumer recycled or post-industrial recycled material, a polycarbonate different from the polycarbonate derived from post-consumer recycled or post-industrial recycled material, or a combination thereof.

13. A method of making the thermoplastic composition of claim 1, the method comprising melt-mixing the components of the composition.

14. The method of claim 13, further comprising molding, casting, or extruding the composition to provide the article.

15. An article comprising the thermoplastic composition of claim 1.

16. The thermoplastic composition of claim 1, wherein the ratio of the siloxane content provided to the thermoplastic composition by the first poly (carbonate siloxane) to the siloxane content provided to the thermoplastic composition by the second poly (carbonate siloxane) is between 3.4:1 and 1:2.

* * * * *